(12) United States Patent
Arnouse

(10) Patent No.: US 12,149,286 B1
(45) Date of Patent: Nov. 19, 2024

(54) SYSTEMS, DEVICES, AND METHODS FOR SECURE COMMUNICATIONS

(71) Applicant: Arnouse Digital Devices Corp., Lake Success, NY (US)

(72) Inventor: Michael Arnouse, Old Brookville, NY (US)

(73) Assignee: Arnouse Digital Devices Corp., Lake Success, NY (US)

( * ) Notice: Subject to any disclaimer, the term of this patent is extended or adjusted under 35 U.S.C. 154(b) by 200 days.

(21) Appl. No.: 17/572,990

(22) Filed: Jan. 11, 2022

Related U.S. Application Data

(60) Provisional application No. 63/136,143, filed on Jan. 11, 2021.

(51) Int. Cl.
*H04B 10/00* (2013.01)
*H04B 10/2575* (2013.01)
*H04B 10/27* (2013.01)
*H04B 10/64* (2013.01)
*H04J 14/00* (2006.01)

(52) U.S. Cl.
CPC ....... *H04B 10/25759* (2013.01); *H04B 10/27* (2013.01); *H04B 10/64* (2013.01)

(58) Field of Classification Search
CPC ............... H04J 14/0201; H04J 14/0202; H04J 14/0221; H04B 10/03; H04B 10/032; H04B 10/038; H04B 10/40; H04B 10/50; H04B 10/501
See application file for complete search history.

(56) References Cited

U.S. PATENT DOCUMENTS

| | | | | |
|---|---|---|---|---|
| 5,815,678 A | * | 9/1998 | Hoffman | H04L 12/40058 710/305 |
| 2003/0081279 A1 | * | 5/2003 | Uchino | H04B 10/032 398/5 |
| 2015/0055945 A1 | * | 2/2015 | Wellbrock | H04J 14/021 398/2 |

* cited by examiner

*Primary Examiner* — Daniel G Dobson
(74) *Attorney, Agent, or Firm* — DLA Piper LLP (US)

(57) ABSTRACT

Systems, devices, and methods for secure communications are provided. An electronic device includes at least one wired communication port, a processor, a plurality of fiber optic communication ports, and a microcontroller. Each of the plurality of fiber optic communication ports includes an opto-electric signal converter. The microcontroller is configured to select one opto-electric signal converter by controlling power supplied to the selected opto-electric signal converter and removing power from the non-selected opto-electric signal converters. The processor is configured to route at least one of voice or data from the at least one wired communication port to the selected opto-electric signal converter.

6 Claims, 3 Drawing Sheets

SYSTEMS, DEVICES, AND METHODS FOR SECURE COMMUNICATIONS

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
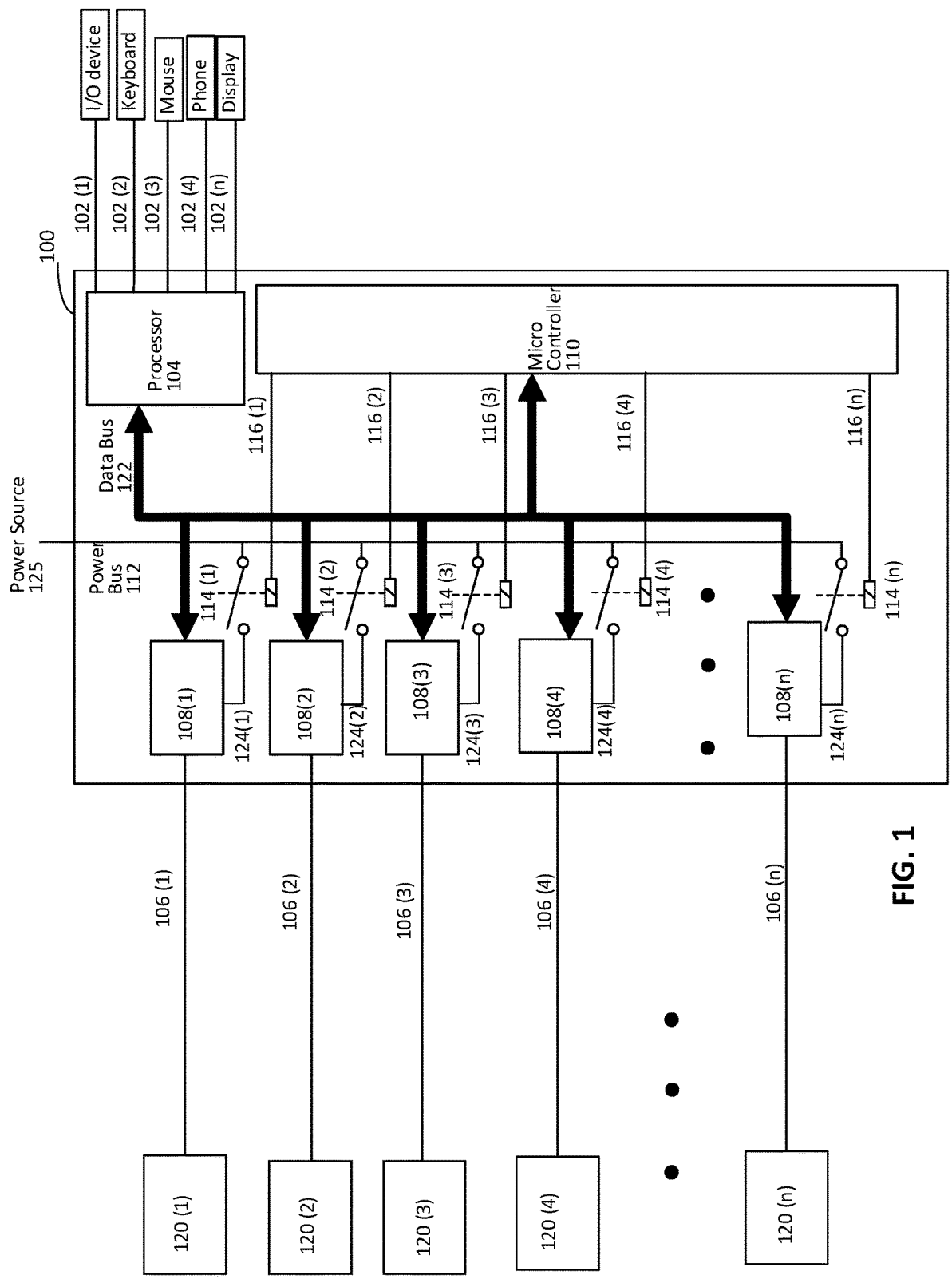
FIG. 1 is a block diagram of a secure communications controller, according to an embodiment of the present disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure describes systems, devices, and methods for secure communications. In some embodiments, the systems, devices, and methods may include selecting a fiber optic communication path between a host computer and a client computer. The selected fiber optic communication path may be selected to the mutual exclusion of all other fiber optic communication paths in the system. The systems, devices, and methods may select only one fiber optic communication path in the network at any one period of time. Multiple methods of selecting the fiber optic communication path with mutual exclusivity is described in detail below. In some examples, the network may include multiple communication paths, each of the paths may have a different level of security (e.g., top secret, secret, classified, unclassified) associated with the path. In some examples, each of the communication paths may be isolated from the other paths such that cross talk or cross coupling between the paths is eliminated, further increasing the security of the communication system.

FIG. 1 illustrates a block diagram of a secure communications controller 100 according to an embodiment of the present disclosure. The secure communications controller 100 may be used for selecting a secure communication path in a computer network. The secure communications controller 100 may include devices for fiber optic switching and integrated keyboard video, mouse (KVM), phone interface(s). The secure communications controller 100 may include communication ports 102(1) . . . 102(n) (e.g., wired communication ports). The communication ports 102(1) . . . 102(n) may include universal serial bus, display port, ethernet, digital video interface, high definition multimedia interface, thunderbolt, or a combination thereof. The secure communications controller 100 may include a plurality of fiber optic communication ports 106(1) . . . 106(n). Each the plurality of fiber optic communication ports 106(1) . . . 106(n) may be connected to opto-electric signal converters 108(1) . . . 108(n). Data bus 122 may connect the processor 104 to the opto-electric signal converters 108(1) . . . 108(n). The microcontroller 110 may be configured to select one opto-electric signal converter 108 by controlling power supplied by power source 125 to the selected opto-electric signal converter 108 and removing power from the non-selected opto-electric signal converters 108. For example, the secure communications controller 100 may include a power bus 112. The power bus 112 may be connected to the power supply inputs 124(1) . . . 124(n) on the opto-electric signal converters 108(1) . . . 108(n) through switches 114(1) . . . 114(n) (e.g., relays, transistors, FETs). Each of the switches 114(1) . . . 114(n) may be controlled by output ports 116(1) . . . 116(n) (e.g., general purpose output ports) of the microcontroller 110.

The microcontroller 110 may include a program, that when executed, selects one of the switches 114(1) . . . 114(n) to power only one of the opto-electric signal converters 108(1) . . . 108(n) at a time. The microcontroller 110 may receive a user input to select which opto-electric signal converter 108(1) . . . 108(n) to select and provide power to operate. The microcontroller 110 may receive a user input from a device (e.g., a thin-client device) connected to the processor 104 through communication ports 102(1) . . . 102(n). Only one opto-electric signal converter 108(1) . . . 108(n) may be powered at any point in time based on the user input. The remaining opto-electric signal converters 108(1) . . . 108(n) will be unpowered and therefore unable to communicate data. Each of the opto-electric signal converters 108(1) . . . 108(n) may be connected via optical fiber to a remote host computer 120(1) . . . 120(n). The remote host computer 120(1) . . . 120(n) may be electronically and physically secured (e.g., installed in a faraday cage) to prevent unwanted hacking or intrusion. The processor 104 may be configured to securely route voice and/or data to and from the communication ports 102(1) . . . 102(n) through the selected opto-electric signal converter 108(1) . . . 108(n) and optical fiber 106(1) . . . 106(n) to the selected host computer 120(1) . . . 120(n). Each of the host computers 120(1) . . . 120(n) may be associated with a different level of security classification (e.g., top secret, secret, classified, or unclassified). The security classification may be determined by a governmental entity. The systems, devices, and methods of the present disclosure may allow a computing device connected to communication ports 102(1) . . . 102(n) to securely communicate with one of the selected host computers 120(1) . . . 120(n) while preventing communication with the non-selected host computers 120(1) . . . 120(n). For example, the user may select host computer 120(1) to securely communicate with. The remaining host computers 120(2) . . . 120(n) will be isolated and unable to communicate with the secure communications controller 100. The computing device may include (without being limited to) at least one of a tablet computer, a laptop computer, a desktop computer, a keyboard, a display, a phone (e.g., a voice over Internet protocol phone), or a mouse. In some examples, the secure communications controller 100 may be integrated into the computing device.

Figure 2:
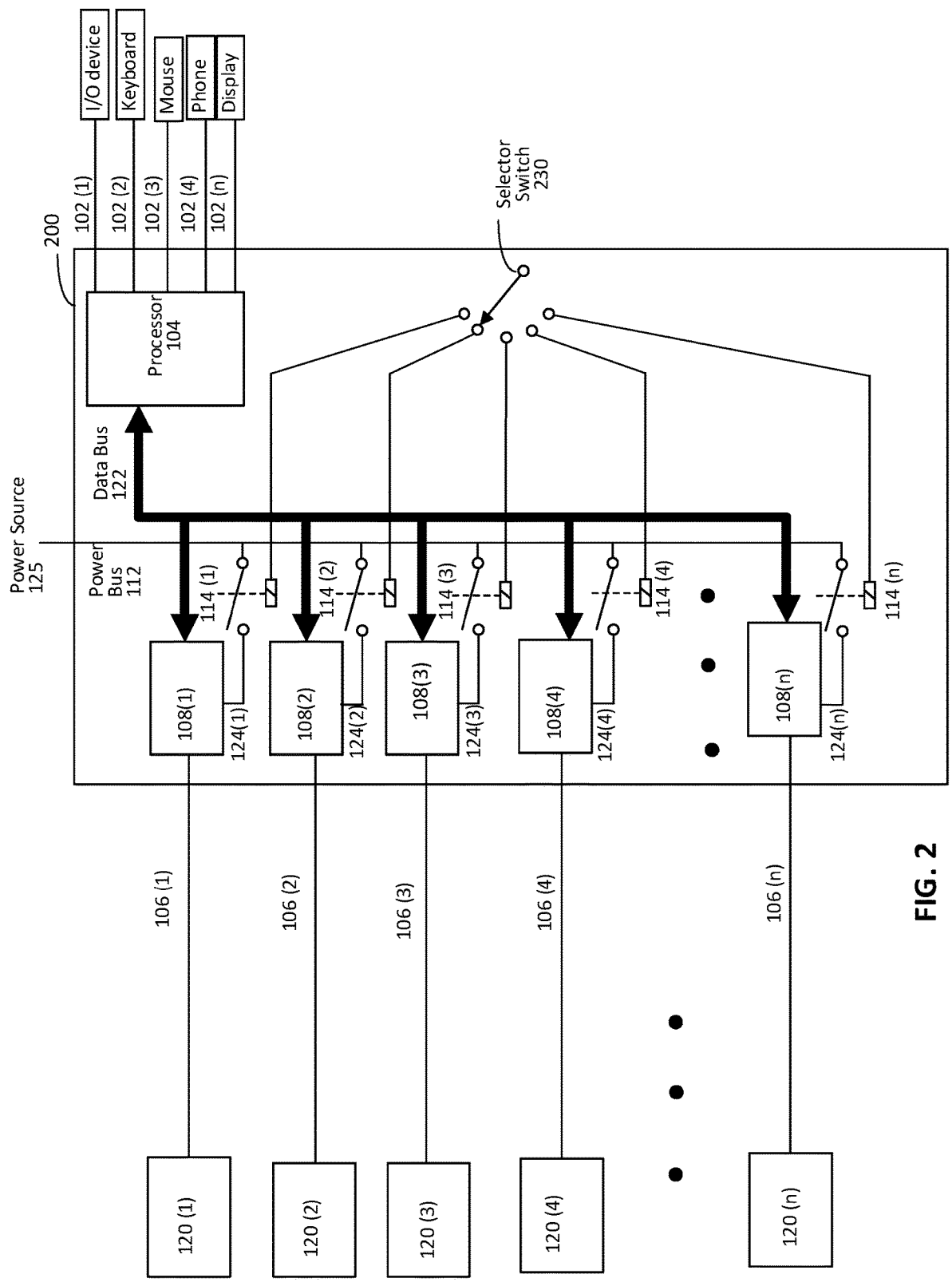
FIG. 2 is a block diagram of a secure communications controller, according to an embodiment of the present disclosure.

FIG. 2 illustrates a block diagram of a secure communications controller 200 according to an embodiment of the present disclosure. The secure communications controller 200 may be used for selecting a secure communication path in a computer network. The secure communications controller 200 may include devices for fiber optic switching and integrated keyboard video, mouse (KVM), phone interface(s). The secure communications controller 200 may include communication ports 102(1) ... 102(n) (e.g., wired communication ports). The communication ports 102(1) ... 102(n) may include universal serial bus, display port, ethernet, digital video interface, high definition multimedia interface, thunderbolt, or a combination thereof. The secure communications controller 200 may include a plurality of fiber optic communication ports 106(1) ... 106(n). Each the plurality of fiber optic communication ports 106(1) ... 106(n) may be connected to opto-electric signal converters 108(1) ... 108(n). Data bus 122 may connect the processor 104 to the opto-electric signal converters 108(1) ... 108(n). The microcontroller 110 (shown in FIG. 1) may be configured to select one opto-electric signal converter 108 by controlling power supplied by power source 125 to the selected opto-electric signal converter 108 and removing power from the non-selected opto-electric signal converters 108. For example, the secure communications controller 200 may include a power bus 112. The power bus 112 may be connected to the power supply inputs 124(1) ... 124(n) on the opto-electric signal converters 108(1) ... 108(n) through switches 114(1) ... 114(n) (e.g., relays, transistors, FETs). Each of the switches 114(1) ... 114(n) may be controlled by selector switch 230.

The selector switch 230 may be configured to select one opto-electric signal converter 108(1) ... 108(n) by controlling to the selected opto-electric signal converter 108(1) ... 108(n) and removing power from the non-selected opto-electric signal converters 108(1) ... 108(n). For example, the fiber optic switching device may include a power bus 112. The power bus 112 may be connected to the power supply inputs 124(1) ... 124(n) on the opto-electric signal converters 108(1) ... 108(n) through switches 114(1) ... 114(n) (e.g., a relay). Each of the power switches 114(1) ... 114(n) may be controlled by the selector switch 230. The selector switch 230 may include a single pole, multi-throw selector switch or a plurality of single-pole, single throw switches that selects one of the power switches 114(1) ... 114(n) to power only one of the opto-electric signal converters 108(1) ... 108(n) at a time. The selector switch 230 may be a manual switch controlled by a user to determine which opto-electric signal converter 108(1) ... 108(n) to select and power. Only one opto-electric signal converter 108 may be powered at any point in time based on the user input. The remaining opto-electric signal converters 108(1) ... 108(n) will be unpowered and therefore unable to communicate data. Each of the opto-electric signal converters 108(1) ... 108(n) may be connected via optical fiber to a remote host computer 120(1) ... 120(n). The remote host computer 120(1) ... 120(n) may be electronically and physically secured (e.g., installed in a faraday cage) to prevent unwanted hacking or intrusion. The processor 104 may be configured to securely route voice and/or data to and from the communication ports 102(1) ... 102(n) through the selected opto-electric signal converter 108(1) ... 108(n) and optical fiber 106(1) ... 106(n) to the selected host computer 120(1) ... 120(n). Each of the host computers 120(1) ... 120(n) may be associated with a different level of security classification (e.g., top secret, secret, classified, or unclassified). The security classification may be determined by a governmental entity. The systems, devices, and methods of the present disclosure may allow a computing device connected to communication ports 102(1) ... 102(n) to securely communicate with one of the selected host computers 120(1) ... 120(n) while preventing communication with the non-selected host computers 120(1) ... 120(n). For example, the user may select host computer 120(1) to securely communicate with. The remaining host computers 120(2) ... 120(n) will be isolated and unable to communicate with the secure communications controller 200. The computing device may include (without being limited to) at least one of a tablet computer, a laptop computer, a desktop computer, a keyboard, a display, a phone (e.g., a voice over Internet protocol phone), or a mouse. In some examples, the secure communications controller 200 may be integrated into the computing device.

Figure 3:
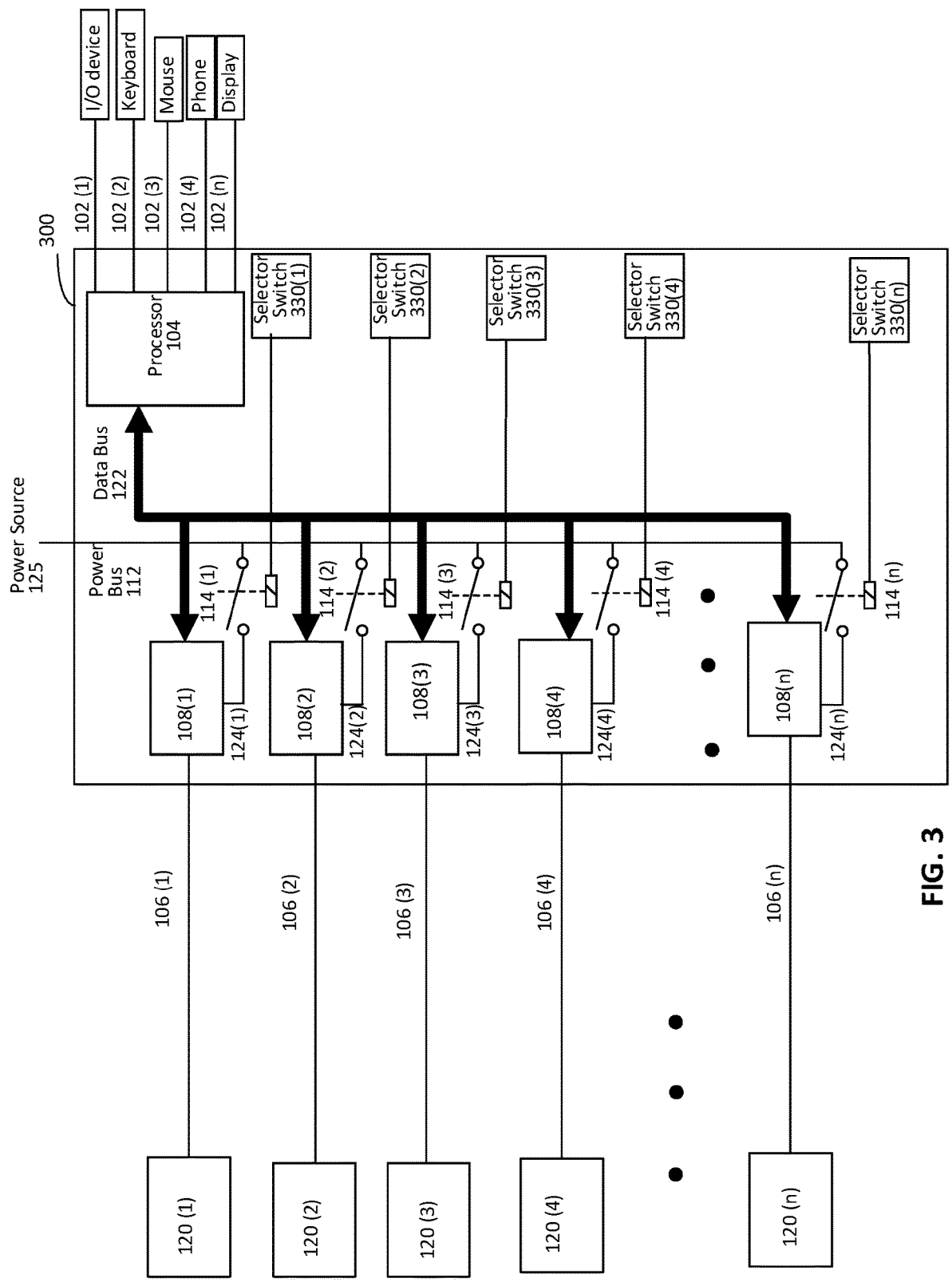
FIG. 3 is a block diagram of a secure communications controller, according to an embodiment of the present disclosure.

FIG. 3 illustrates a block diagram of a secure communications controller 300 according to an embodiment of the present disclosure. The secure communications controller 300 may be used for selecting a secure communication path in a computer network. The secure communications controller 300 may include devices for fiber optic switching and integrated keyboard video, mouse (KVM), phone interface(s). The secure communications controller 300 may include communication ports 102(1) ... 102(n) (e.g., wired communication ports). The communication ports 102(1) ... 102(n) may include universal serial bus, display port, ethernet, digital video interface, high definition multimedia interface, thunderbolt, or a combination thereof. The secure communications controller 300 may include a plurality of fiber optic communication ports 106(1) ... 106(n). Each the plurality of fiber optic communication ports 106(1) ... 106(n) may be connected to opto-electric signal converters 108(1) ... 108(n). Data bus 122 may connect the processor 104 to the opto-electric signal converters 108(1) ... 108(n). The microcontroller 110 (shown in FIG. 1) may be configured to select one opto-electric signal converter 108 by controlling power supplied by power source 125 to the selected opto-electric signal converter 108 and removing power from the non-selected opto-electric signal converters 108. For example, the secure communications controller 300 may include a power bus 112. The power bus 112 may be connected to the power supply inputs 124(1) ... 124(n) on the opto-electric signal converters 108(1) ... 108(n) through switches 114(1) ... 114(n) (e.g., relays, transistors, FETs). Each of the switches 114(1) ... 114(n) may be controlled by selector switch 330. The selector switch 330 may be configured to select one opto-electric signal converter 108(1) ... 108(n) by controlling to the selected opto-electric signal converter 108(1) ... 108(n) and removing power from the non-selected opto-electric signal converters 108(1) ... 108(n). For example, the fiber optic switching device may include a power bus 112. The power bus 112 may be connected to the power supply inputs 124(1) ... 124(n) on the opto-electric signal converters 108(1) ... 108(n) through switches 114(1) ... 114(n) (e.g., a relay). Each of the power switches 114(1) ... 114(n) may be controlled by the selector switches 330(1) ... 330(n).

The selector switches 330(1) ... 330(n) may include individual pushbutton switches that selects one of the power switches 114(1) ... 114(n) to power only one of the opto-electric signal converters 108(1) ... 108(n) at a time. The selector switches 330(1) ... 330(n) may be manual switches controlled by a user to determine which opto-electric signal converter 108(1) ... 108(n) to select and power. The selector switches 330(1) ... 330(n) may be configured mechanically and/or electrically to enable only one pushbutton switch 330 to be selected at any point in time. Only one opto-electric signal converter 108 may be powered at any point in time based on the switch 330 selected by the user input. The remaining opto-electric signal converters 108(1) ... 108(n) will be unpowered and therefore unable to communicate data. Each of the opto-electric signal converters 108(1) . . . **108(*n*) may be connected via optical fiber to a remote host computer 120(1) . . . 120(*n*). The remote host computer 120(1) . . . 120(*n*) may be electronically and physically secured (e.g., installed in a faraday cage) to prevent unwanted hacking or intrusion. The processor 104 may be configured to securely route voice and/or data to and from the communication ports 102(1) . . . 102(*n*) through the selected opto-electric signal converter 108(1) . . . 108(*n*) and optical fiber 106(1) . . . 106(*n*) to the selected host computer 120(1) . . . 120(*n*). Each of the host computers 120(1) . . . 120(*n*) may be associated with a different level of security classification (e.g., top secret, secret, classified, or unclassified). The security classification may be determined by a governmental entity. The systems, devices, and methods of the present disclosure may allow a computing device connected to communication ports 102(1) . . . 102(*n*) to securely communicate with one of the selected host computers 120(1) . . . 120(*n*) while preventing communication with the non-selected host computers 120(1) . . . 120(*n*). For example, the user may select host computer 120(1) to securely communicate with. The remaining host computers 120(2) . . . 120(*n*) will be isolated and unable to communicate with the secure communications controller 300. The computing device may include (without being limited to) at least one of a tablet computer, a laptop computer, a desktop computer, a keyboard, a display, a phone (e.g., a voice over Internet protocol phone), or a mouse. In some examples, the secure communications controller 300** may be integrated into the computing device.

By way of non-limiting examples, the following embodiments are included in the present disclosure.

- Example 1: An electronic device, comprising at least one wired communication port; a processor; a plurality of fiber optic communication ports, wherein each the plurality of fiber optic communication ports comprises an opto-electric signal converter; and a microcontroller, wherein the microcontroller is configured to select one opto-electric signal converter by controlling power supplied to the selected opto-electric signal converter and removing power from the non-selected opto-electric signal converters; and the processor is configured to route voice and/or data from the at least one wired communication port to the selected opto-electric signal converter.
- Example 2: The electronic device of Example 1, wherein the microcontroller selects the one opto-electric signal converter by controlling a switch that supplies power to the selected opto-electric signal converter
- Example 3: The electronic device of Example 1 or 2, wherein each of the plurality of fiber optic communication ports is connected via optical fiber to a host computer.
- Example 4: The electronic device of Examples 1 through 3, wherein the host computer is protected from electromagnetic interference.
- Example 5: The electronic device of Examples 1 through 4, wherein each of the plurality of fiber optic communication ports is associated with a different level of security classification.
- Example 6: The electronic device of Examples 1 through 3, wherein the at least one wired communication port is connected to at least one of: a tablet computer; a laptop computer; a desktop computer; a keyboard; a display; a phone; or a mouse.
- Example 7: An electronic device, comprising at least one wired communication port; a processor; a plurality of fiber optic communication ports, wherein each the plurality of fiber optic communication ports comprises an opto-electric signal converter; and a selector switch, wherein the selector switch is configured to select one opto-electric signal converter by supplying power to the selected opto-electric signal converter and removing power from the non-selected opto-electric signal converters; and the processor is configured to route voice and/or data from the at least one wired communication port to the selected opto-electric signal converter.
- Example 8: The electronic device of Example 7, wherein the selector switch comprises a single pole, multi-throw selector switch.
- Example 9: The electronic device of Examples 7 or 8, wherein the selector switch comprises a plurality of single pole, single-throw selector switches.
- Example 10: The electronic device of Examples 7 through 9, wherein each of the plurality of fiber optic communication ports is connected via optical fiber to a host computer.
- Example 11: The electronic device of Examples 7 through 10, wherein the host computer is protected from electromagnetic interference.
- Example 12: The electronic device of Examples 7 through 11, wherein each of the plurality of fiber optic communication ports is associated with a different level of security classification.
- Example 13: The electronic device of Examples 7 through 12, wherein the at least one wired communication port is connected to at least one of: a tablet computer; a laptop computer; a desktop computer; a keyboard; a display; a phone; or a mouse.
- Example 14: An electronic device, comprising at least one wired communication port; a processor; a plurality of fiber optic communication ports, wherein each the plurality of fiber optic communication ports comprises an opto-electric signal converter; and a plurality of selector switches, wherein each of the plurality of selector switches is configured to select one opto-electric signal converter by supplying power to the selected opto-electric signal converter and removing power from the non-selected opto-electric signal converters; and the processor is configured to route at least one of voice or data from the at least one wired communication port to the selected opto-electric signal converter.
- Example 15: The electronic device of Example 14, wherein each of the plurality of selector switches comprises a pushbutton switch.
- Example 16: The electronic device of Examples 14 or 15, wherein each of the plurality of selector switches is configured to be individually selected to the exclusion of the other selector switches.
- Example 17: The electronic device of Examples 14 through 16, wherein each of the plurality of fiber optic communication ports is connected via optical fiber to a host computer.
- Example 18: The electronic device of Examples 14 through 17, wherein the host computer is protected from electromagnetic interference.
- Example 19: The electronic device of Examples 14 through 18, wherein each of the plurality of fiber optic communication ports is associated with a different level of security classification.
- Example 20: The electronic device of Examples 14 through 19, wherein the at least one wired communication port is connected to at least one of: a tablet computer; a laptop computer; a desktop computer; a keyboard; a display; a phone; or a mouse.

In some examples, the term "processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

The invention claimed is:

1. An electronic device, comprising:
   at least one wired communication port;
   a plurality of opto-electric signal converters, each configured to be selectively coupled to a power supply, each opto-electric signal converter forming part of a respective one of a plurality of fiber optic communication ports;
   a processor configured to route at least one of voice or data from the at least one wired communication port to the plurality of opto-electric signal converters; and
   a microcontroller, wherein:
   the microcontroller is configured to:
   select a first fiber optic communication port from the plurality of fiber optic communication ports based on a predefined level of security classification associated with the first fiber optic communication port;
   enable the first fiber optic communication port by directing power to its respective opto-electric signal converter from the power supply; and
   disable remaining ports of the plurality of fiber optic communication ports, except the first fiber optic communication port, by removing the power from the power supply to their respective opto-electric signal converters, such that the remaining ports remain unpowered and unable to communicate the at least one of the voice or the data.

2. The electronic device of claim 1, wherein the microcontroller enables the first fiber optic communication port by controlling a switch that supplies power to its respective opto-electric signal converter.

3. The electronic device of claim 1, wherein each of the plurality of fiber optic communication ports is connected via optical fiber to a host computer.

4. The electronic device of claim 3, wherein the host computer is protected from electromagnetic interference.

5. The electronic device of claim 1, wherein each of the plurality of fiber optic communication ports is associated with a different predefined level of security classification.

6. The electronic device of claim 1, wherein the at least one wired communication port is connected to at least one of:
   a tablet computer;
   a laptop computer;
   a desktop computer;
   a keyboard;
   a display;
   a phone; or
   a mouse.

* * * * *